(12) United States Patent
Kyle, II

(10) Patent No.: US 8,605,223 B2
(45) Date of Patent: Dec. 10, 2013

(54) SINGLE LICENSE MULTI-DIRECTIONAL DIGITAL BROADCAST TELEVISION SYSTEM

(75) Inventor: John N. Kyle, II, Davie, FL (US)

(73) Assignee: DTVCast Development LLC, Miami, FL (US)

( * ) Notice: Subject to any disclaimer, the term of this patent is extended or adjusted under 35 U.S.C. 154(b) by 0 days.

(21) Appl. No.: 13/363,595

(22) Filed: Feb. 1, 2012

(65) Prior Publication Data

US 2013/0194509 A1 Aug. 1, 2013

(51) Int. Cl.
*H04N 5/38* (2006.01)

(52) U.S. Cl.
USPC .......................................... 348/723

(58) Field of Classification Search
USPC ........... 348/723, 724; 725/67, 72; 343/700 R, 343/722, 723, 727, 728, 730, 757, 777; 455/500, 509, 63.4
IPC ............................................... H04N 5/38,5/40
See application file for complete search history.

(56) References Cited

U.S. PATENT DOCUMENTS

| | | | | |
|---|---|---|---|---|
| 5,774,193 A | * | 6/1998 | Vaughan | 348/723 |
| 5,999,145 A | * | 12/1999 | Niekamp | 343/890 |
| 6,870,443 B2 | * | 3/2005 | Stenberg et al. | 333/134 |
| 2011/0149157 A1 | * | 6/2011 | Frerking | 348/723 |

OTHER PUBLICATIONS

Brain, Marshall. "How Digital Television Works" Jan. 10, 2001. HowStuffWorks.com. <http://electronics.howstuffworks.com/dtv.htm> May 7, 2012.
Brain, Marshall. "How Radio Works" Dec. 7, 2000. HowStuffWorks.com. <http://electronics.howstuffworks.com/radio.htm> May 7, 2012.

* cited by examiner

*Primary Examiner* — Sherrie Hsia
(74) *Attorney, Agent, or Firm* — Steven M. Greenberg, Esq.; Kara A. Brotman, Esq.; Carey, Rodriquez, Greenberg & O'Keefe, LLP

(57) ABSTRACT

Digital data distribution using a single license multi-directional digital television broadcasting method and device is provided. The method can include transmitting a first directional ATSC standards conforming data and digital television signal using a first transmitter and antenna combination and transmitting a second directional ATSC standards conforming data and digital television signal using a second transmitter and antenna combination. The transmission of the first and second directional signals uses a single broadcast television license. The device can include a plurality of antennas mounted to a broadcast tower and a plurality of transmitters coupled individually to a different one of the antennas, each antenna and transmitter adapted to broadcast a directional signal using a single digital broadcast license.

11 Claims, 5 Drawing Sheets

SINGLE LICENSE MULTI-DIRECTIONAL DIGITAL BROADCAST TELEVISION SYSTEM

BACKGROUND OF THE INVENTION

1. Field of the Invention

The present invention relates to telecommunications and more particularly to digital broadcast television.

2. Description of the Related Art

In the U.S, a broadcast license is a specific type of spectrum license that grants the licensee the privilege of using a portion of the radio frequency spectrum in a given geographical area for broadcasting purposes. The determination of which frequencies can be used by various licensees is done through a frequency allocation process, which in the U.S., is specified by the Federal Communications Commission (FCC). The radio frequency spectrum can be divided differently, depending on for what it will be used. For instance, broadcasting for TV channels 21-36 can be allocated between 512 MHz and 608 MHz, while radiolocation, metrological aids, and maritime radionavigation can be allocated between 5.6 GHz and 5.65 GHz. Of note, the FCC regulates access to the spectrum for private, state, and local governmental uses, but the National Telecommunications and Information Administration under the Commerce Department allocates spectrum use by the federal government, including the military.

In order to receive a broadcast license, an applicant must file with the FCC, which decides whether to grant or deny the application. The exact process is different for public radio and public television, for community radio and community television, and for commercial applicants and licensees. Of note, in some cases (e.g., CB radio), the public may use the spectrum without the need of a license. A broadcast license typically specifies the following information: geographic coordinates, carrier frequency, bandwidth, modulation type, effective radiated power, height above average terrain, and directional antenna radiation pattern.

Once a license is granted, a transmission can be broadcasted. The broadcasting of television initially involves the analog transmission of broadcasting encoded analog audio and video signals. Broadcasters using analog television systems encode their signal using analog encoding and then modulate the encoded signal onto a very high frequency (VHF) or ultra high frequency (UHF) carrier. The analog television signal contains timing and synchronization information so that the receiver can reconstruct a two-dimensional moving image from a one-dimensional time-varying signal. The television system for each country will specify the number of television channels within the UHF or VHF frequency ranges. Of note, a channel actually consists of two signals: the picture information is transmitted using amplitude modulation on one frequency, and the sound is transmitted with frequency modulation at a frequency with a fixed offset (typically four and one-half to six megahertz) from the picture signal.

In the United States, full-power over-the-air broadcasts transitioned from analog broadcasts to digital television (DTV) in June 2009. Of note, in addition to full-power stations, there are also three other categories of TV stations in the U.S.: low-power broadcasting stations, Class A stations, and TV translator stations. Of further note, the digital broadcast television industry uses the Advanced Television Systems Committee (ATSC) standards for digital television transmission. Today delivery of video is accomplished using one transmitter, one antenna, and one frequency in an omni-directional, over-the-air, three hundred sixty degree radius in a given coverage area in conjunction with a single broadcast license, which allows up to 19.39 Mbps of data per broadcast television license to be broadcasted.

BRIEF SUMMARY OF THE INVENTION

Embodiments of the present invention address deficiencies of the art with respect to telecommunications and provide a novel and non-obvious method and device for single license multi-directional digital television broadcasting. In an embodiment of the invention, a method for single license multi-directional digital television broadcasting is provided and can include transmitting a first directional ATSC standards conforming data and digital television signal using a first transmitter and antenna combination, transmitting a second directional ATSC standards conforming data and digital television signal using a second transmitter and antenna combination. The transmission of the first and second directional signals uses a single broadcast television license.

A device for single license multi-directional digital television broadcasting can also be provided and can include a plurality of antennas mounted to a broadcast tower and a plurality of transmitters coupled individually to another of the antennas. Each antenna and transmitter can be adapted to broadcast a directional signal using a single digital broadcast television license.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred; it is understood, however, that the invention is not limited to the precise arrangements and instrumentalities shown, wherein.

DETAILED DESCRIPTION OF THE INVENTION

Embodiments of the invention provide for digital data distribution using a single license multi-directional digital television broadcasting method and device. The device can utilize multiple separate transmitters and multiple separate antennas. Each separate antenna can be mounted to a broadcast tower, and each transmitter can be coupled individually to a different one of the antennas. Each antenna and transmitter can be adapted to broadcast a separate single directional signal using a single digital broadcast television license via the existing ATSC standard for digital transmission of over-the-air television. In other words, one broadcast television license is divided into two or more directionally broadcasted signals, and a directionally broadcasted signal transmitting data and digital television is transmitted for each antenna and transmitter combination in compliance with ATSC standards. In this way, substantial data can be delivered to multiple users through one broadcast very high frequency (VHF) or ultra high frequency (UHF) television license.

Figure 1:
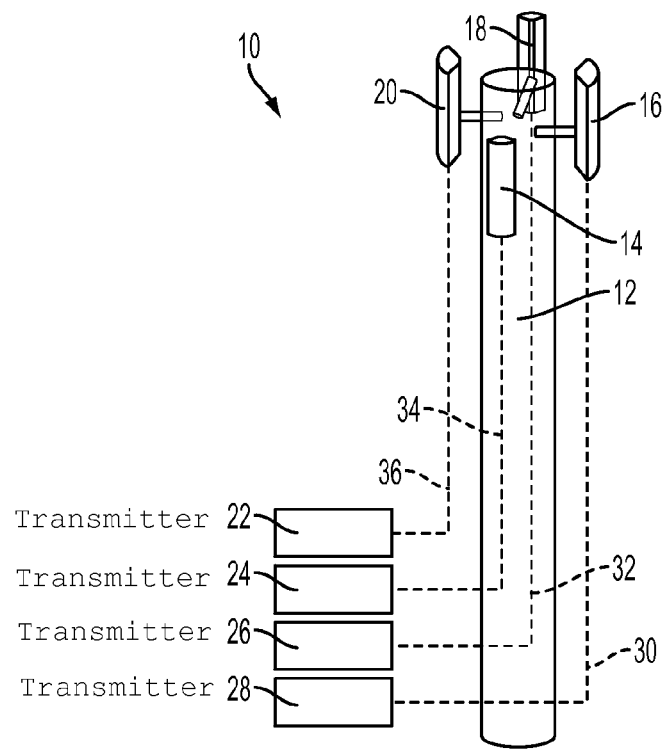
FIG. 1 is a perspective view a single license multi-directional digital broadcast television device in accordance with an embodiment of this invention.

In further illustration, FIG. 1 shows a perspective view in accordance with an embodiment of a single license multi-directional digital broadcast device. As shown in FIG. 1, a single license multi-directional digital broadcast device 10 can include multiple, different antennas 14, 16, 18, 20 mounted to a broadcast tower 12. Of note, the broadcast tower 12 is not limited to a tower per se, but can include any structure that can support the antennas 14, 16, 18, 20—for instance a mast, a pole, or a building. Each antenna 14, 16, 18, 20 can be directed at any angle from the broadcast tower 12; in other words, each antenna can be located anywhere around the broadcast tower 12. The antennas 14, 16, 18, 20 can be coupled individually to multiple, different transmitters 22, 24, 26, 28, in such a way that there is a one-to-one ratio between antenna and transmitter. Consequently, a single digital broadcast license is divided into multiple directional broadcasted signals, and the number of times a single digital broadcast license is divided is determined by the number of antenna and transmitter combinations.

In one aspect of the embodiment shown in FIG. 1, there can be four antennas 14, 16, 18, 20, where each antenna is a narrow lobe panel antenna. Each antenna, for instance antenna 14, 16, 18, 20, can be mounted at four equally-spaced points around the broadcast tower 12 so as to be directed at zero degrees, ninety degrees, one hundred eighty degrees, and two hundred seventy degrees by any method now known or later developed so as to be in compliance with Federal Communications Commission (FCC) regulations. In other words, each antenna 14, 16, 18, 20 can be mounted every ninety degrees at a distal end of the broadcast tower 12. Further, each antenna can be located at approximately the same height on the broadcast tower 12.

The antennas can be coupled individually to multiple, different transmitters, where each antenna 14, 16, 18, 20 is coupled to one transmitter 24, 28, 26, 22 via a coaxial cable 34, 30, 32, 36, so that a signal can be sent from the transmitter 24, 28, 26, 22 to the antenna 14, 16, 18, 20. In other words, a first directional ATSC standards conforming data and digital television signal can be transmitted using a first transmitter 24 and antenna 14 combination, and a second directional ATSC standards conforming data and digital television signal can be transmitted using a second transmitter 28 and antenna 16 combination. The first and second directional signals can use a single broadcast television license to both signals. Further, a third directional ATSC standards conforming data and digital signal can be transmitted using a third transmitter 26 and antenna 18 combination, and a fourth directional ATSC standards conforming data and digital television signal can be transmitted using a fourth transmitter 22 and antenna 20 combination. Both the third and fourth directional signals use the single broadcast television license as the first and second directional signals. In one instance, the coaxial cable 30, 32, 34, 36 can have a diameter of one and five-eighths inches. The transmitter 22, 24, 26, 28 can be a digital VHF broadcast transmitter or a digital UHF broadcast transmitter. Each transmitter 22, 24, 26, 28 can range in power level from at least one hundred watts to fifteen kilowatts, or higher. Of note, each antenna 14, 16, 18, 20, transmitter 24, 28, 26, 22, and broadcast tower 12 are in compliance with FCC regulations.

Figure 2:
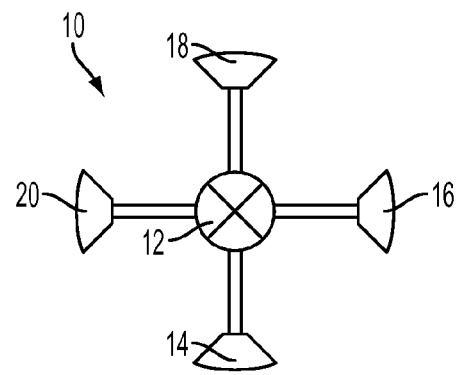
FIG. 2 is an aerial view of a single license multi-directional digital broadcast television device of FIG. 1.
Figure 3:
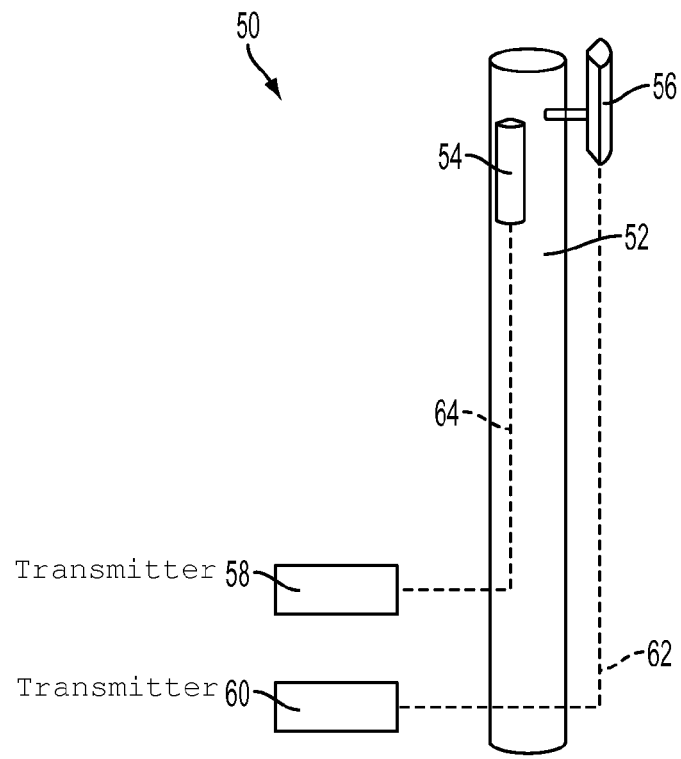
FIG. 3 is a perspective view of a single license multi-directional digital broadcast television device in accordance with an embodiment of this invention.

In yet further illustration, FIG. 2 is an aerial view of a single license multi-directional digital broadcast television device 10 of FIG. 1, showing each antenna 14, 16, 18, 20 mounted approximately every ninety degrees around a broadcast tower 12. In even further illustration, FIG. 3 illustrates a perspective view of a single license multi-directional digital broadcast television device 50 in accordance with an embodiment of this invention. In this instance, a single license multi-directional digital broadcast television device 50 can have two antennas 54, 56 mounted to a broadcast tower 52, where one antenna 54 is mounted at zero degrees and a second antenna 56 is mounted at ninety degrees. Each antenna 54, 56 can be coupled individually via a coaxial cable 64, 62 to two corresponding transmitters 58, 60, so that a first directional ATSC standards conforming data and digital television signal can be transmitted from a first transmitter 58 and first antenna 54. Further, a second directional ATSC standard conforming data and digital television signal can be transmitted using a second transmitter 60 and antenna 56 combinations. The transmission of the first and second directional signals can use a single broadcast television license.

Figure 4:
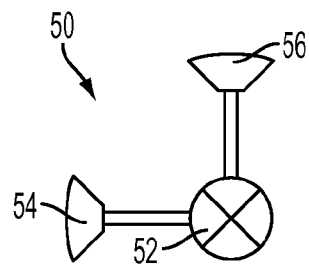
FIG. 4 is an aerial view of a single license multi-directional digital broadcast television device of FIG. 3.
Figure 5:
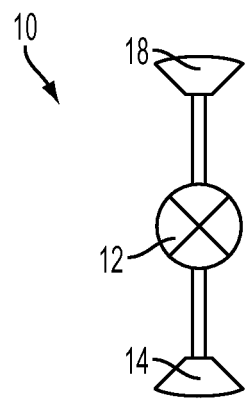
FIG. 5 is an aerial view of an embodiment of a single license multi-directional digital broadcast television device.

In yet even further illustration, FIG. 4 is an aerial view of a single license multi-directional digital broadcast television device 50 of FIG. 3 showing each antenna 54, 56 mounted ninety degrees apart on a broadcast tower 52. In further illustration, FIG. 5 is an aerial view of an embodiment of a single license multi-directional digital broadcast television device 10 showing a first antenna 14 mounted one hundred eighty degrees apart from a second antenna 18. The first and second antennas, 14, 18, respectively, are coupled to a broadcast tower 12.

Figure 6:
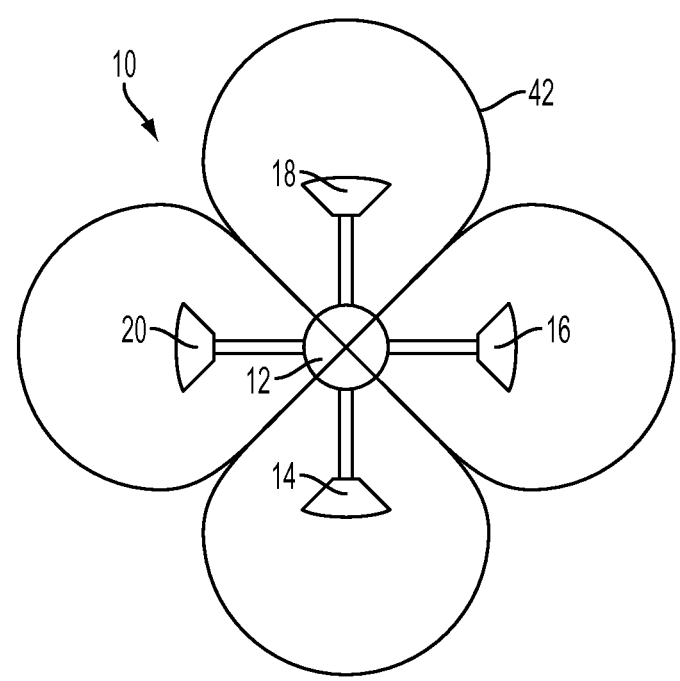
FIG. 6 is an aerial view of an embodiment of a single license multi-directional digital broadcast television device showing signal coverage for a single station.

In yet another illustration, FIG. 6 is an aerial view of an embodiment of a single license multi-directional digital broadcast television device 10 showing a signal 42 for a single station with a plurality of antennas, 14, 16, 18, 20, each of which is mounted around a broadcast tower 12 ninety degrees apart. More specifically, the device 10 can be used to send an ATSC standards conforming signal 42 transmitting data and digital television utilizing multiple, different transmitters 24, 28, 26, 22 and antennas 14, 16, 18, 20 combinations. The conforming signal 42 transmits multiple different directional signals 42 using one broadcast television license, and each different directional signal 42 transmits, utilizing one transmitter and antenna combination. In this way, a "cloverleaf" signal 42 can be used to service four times the number of customers than a standard omni-directional signal; in other words, a "cloverleaf" signal quadruples data capacity, and thus end user density potential, per transmission site. Of note, multiple stations can be used to broadcast a signal. For instance, in one embodiment, one station, such as channel seventeen, can broadcast the signal; in another embodiment, multiple stations, for example, channels seventeen and twenty-one can broadcast the signal.

Figure 7:
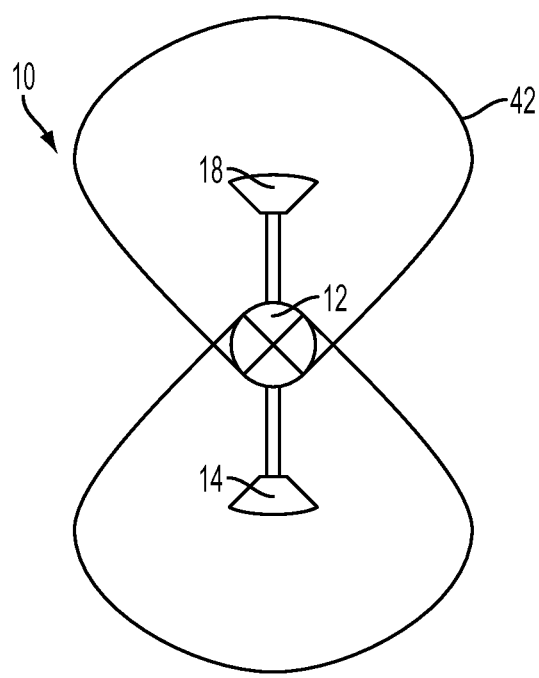
FIG. 7 is an aerial view of an embodiment of a single license multi-directional digital broadcast television device showing signal coverage for a single station; and, FIG. 8 is a flow chart illustrating a process for multi-directional broadcasting using a single broadcast television license.

In another illustration, FIG. 7 is an aerial view of an embodiment of a single license multi-directional digital broadcast television device 10 showing a signal 42 for a single station with a plurality of antennas, 14 18, where each antenna 14, 18 can be mounted around a broadcast tower 12, at least ninety degrees apart and, as shown in FIG. 7, one hundred eighty degrees apart. In this way, a signal 42 can be used to service double the number of customers than a standard omni-directional signal, as more digital data can be distributed.

Figure 8:
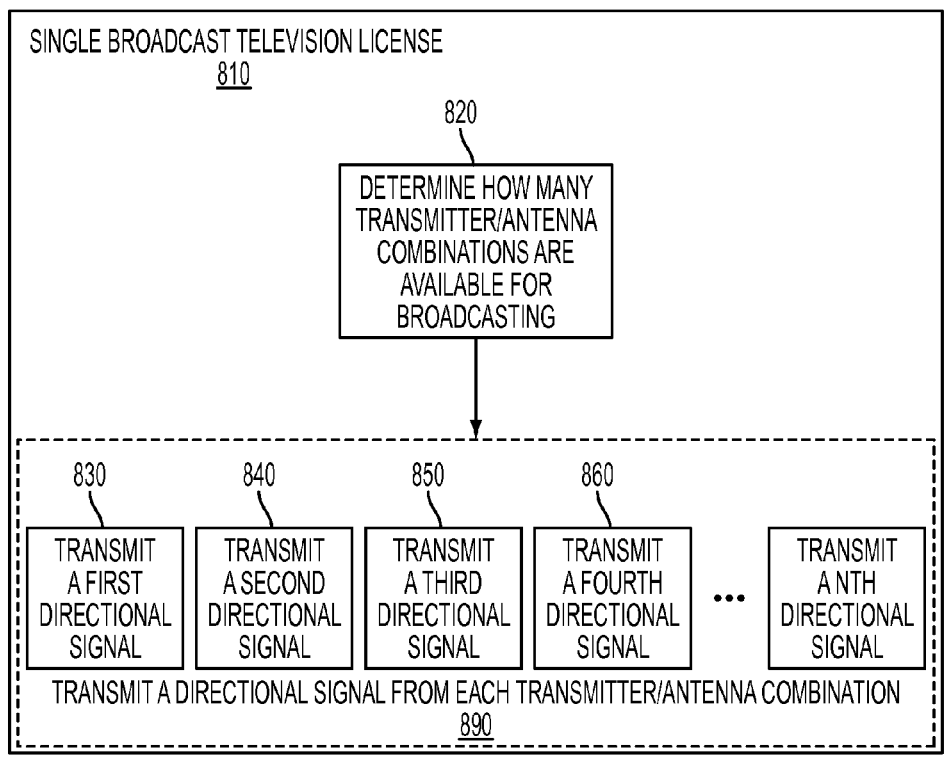

In a final illustration, FIG. 8 is a flow chart depicting a process for multi-directional broadcasting using a single broadcast television license. In block 810, a single broadcast television license can be divided into "N" number of directional signals, as shown in block 890. The "N" number is based upon how many transmitter/antenna combinations are available for broadcasting, as indicated in block 820. For instance, there can be four antennas mounted to a broadcast tower with four individual transmitters each coupled to an antenna. As it is determined that there are four transmitter/antenna combinations, a total of four directional signals can be transmitted. One directional signal is transmitted from each transmitter/antenna combination, as shown in blocks 830, 840, 850, 860. When there are four transmitter/antenna combinations, each directional signal radiates out, in the direction each mounted antenna is facing, creating the "cloverleaf" pattern, as shown in FIG. 6. If there are two transmitter/antenna combinations, the signal transmission may look more like FIG. 7. Of note, each transmission is performed at the same frequency—the frequency assigned to the single broadcast television license 810.

Having thus described the invention of the present application in detail and by reference to embodiments thereof, it will be apparent that modifications and variations are possible without departing from the scope of the invention defined in the appended claims as follows:

1. A method of digital data distribution using single license multi-directional digital television broadcasting comprising:
    transmitting a first directional Advanced Television Systems Committee (ATSC) standards conforming data and digital television signal using a first transmitter and antenna combination;
    transmitting a second directional ATSC standards conforming data and digital television signal using a second transmitter and antenna combination,
    the transmission of the first and second directional signals using a single broadcast television license for a single ATSC standards channel from one broadcast tower.

2. The method of claim 1, further comprising:
    transmitting a third directional ATSC standards conforming data and digital television signal using a third transmitter and antenna combination;
    transmitting a fourth directional ATSC standards conforming data and digital television signal using fourth transmitter and antenna combination,
    the transmission of the third and fourth directional signals using the single broadcast television license for the single ATSC standards channel from the one broadcast tower.

3. The method of claim 2, wherein the transmission of the first, second, third, and fourth directional signals using the single broadcast television license for the single ATSC standards channel from the one broadcast tower approximately quadruples data capacity of the single ATSC standards channel to about 77.56 megabits per second (Mbps).

4. The method of claim 1, wherein each antenna used to transmit a directional ATSC standards conforming data and digital television signal is separated from one another by at least ninety degrees.

5. The method of claim 1, wherein the transmission of the first and second directional signals using the single broadcast television license for the single ATSC standards channel from the one broadcast tower approximately doubles data capacity of the single ATSC standards channel to about 38.78 megabits per second (Mbps).

6. A single license multi-directional digital broadcast television broadcasting device comprising:
    a plurality of antennas mounted to a broadcast tower; and,
    a plurality of transmitters coupled individually to a different one of the antennas, each antenna and transmitter adapted to broadcast a directional signal using a single digital broadcast television license for a single Advanced Television Systems Committee (ATSC) standards channel from the broadcast tower, each one of the plurality of transmitters coupled individually to the different one of the antennas multiples the data capacity of the single ATSC standards channel by a factor equal to the number of the plurality of transmitters coupled individually to the different one of the antennas.

7. The device of claim 6, wherein the antennas are each separated by at least ninety degrees.

8. The device of claim 6, wherein the antennas are four in number and individually coupled to four corresponding ones of the transmitters.

9. The device of claim 6, wherein the antennas are two in number and individually coupled to two corresponding ones of the transmitters.

10. The device of claim 6, wherein the antennas are narrow lobe panel antennas.

11. The device of claim 6, wherein the transmitters are transmitters selected from the group consisting of a digital VHF transmitter and a digital UHF transmitter.

* * * * *